United States Patent
Stoel et al.

(10) Patent No.: US 6,343,315 B1
(45) Date of Patent: Jan. 29, 2002

(54) ENTERTAINMENT/INFORMATION SYSTEM HAVING DISPARATE INTERACTIVE DEVICES

(75) Inventors: Leon P. Stoel; David M. Bankers; Christopher Alan Cinco, all of Sioux Falls, SD (US)

(73) Assignee: LodgeNet Entertainment Corporation, Sioux Falls, SD (US)

( * ) Notice: Subject to any disclaimer, the term of this patent is extended or adjusted under 35 U.S.C. 154(b) by 0 days.

(21) Appl. No.: 09/310,456

(22) Filed: May 12, 1999

(51) Int. Cl.[7] .............................. G06F 3/00; G06F 15/16
(52) U.S. Cl. ....................... 709/204; 709/236; 710/64; 710/67; 713/24; 463/40
(58) Field of Search ................................ 709/200, 204, 709/236; 710/62, 64, 67, 72, 73; 345/329, 330; 713/23, 24, 25; 463/40

(56) References Cited

U.S. PATENT DOCUMENTS

| | | | |
|---|---|---|---|
| 4,837,677 A | 6/1989 | Burrus, Jr. et al. | 364/200 |
| 5,003,301 A | * 3/1991 | Romberg | 345/168 |
| 5,280,586 A | 1/1994 | Kunz et al. | 395/275 |
| RE34,611 E | 5/1994 | Fenwick et al. | 348/7 |
| 5,641,319 A | 6/1997 | Stoel et al. | 463/42 |
| 5,661,517 A | 8/1997 | Budow et al. | 346/13 |
| 5,721,842 A | 2/1998 | Beasley et al. | 395/311 |

* cited by examiner

Primary Examiner—Dung C. Dinh
(74) Attorney, Agent, or Firm—Sheridan Ross P.C.

(57) ABSTRACT

An information/entertainment system having a number of interactive input and output devices is provided. Each interactive input device is electrically connected to a selected output device using a host that communicates with a router apparatus. The router apparatus includes a plurality of emulation assemblies. Each emulation assembly is configured to communicate input information to a particular interactive output device. Input information from a particular interactive input device is received and properly handled by a pre-configured emulation assembly which is electrically connected to the interactive output device associated with that particular interactive input device. This emulation assembly formats the information/data that it receives so that it is acceptable to the interactive output device to which it is connected. The host obtains input information using a slot/subslot arrangement associated with interactive interrogations or polling. The slots/subslots enable the system to obtain inputs at different transmission rates from different interactive input devices.

21 Claims, 5 Drawing Sheets ately rapid
ENTERTAINMENT/INFORMATION SYSTEM HAVING DISPARATE INTERACTIVE DEVICES

FIELD OF THE INVENTION

The present invention relates to a network system and, in particular, to integrating interactive devices having different requirements into an entertainment and/or information system for use, e.g., in a building complex having a number of rooms.

BACKGROUND OF THE INVENTION

Numerous and relatively large lodging complexes, such as hotels, have included certain entertainment and/or information accessing features in their rooms in order to attract customers. In addition to conventional TV programs that can be accessible from each room, other entertainment, shopping and/or business-related options are made available, through television screen displayed menus. These include video on demand, shopping networks, world wide web accessibility and video games that are played independently of the world wide web. The number and kind of interactive devices are expected to increase. Such devices may be marketed by one or more companies and could have different network requirements and/or operation-associated protocols. Current entertainment systems require that present and expected future interactive devices be adapted to their system. That is, in order to properly function with present entertainment systems, the interactive device and/or the entertainment system itself must be modified so that they are compatible with each other. No current entertainment system permits the plugging in or other interconnection of each and any interactive device without first incorporating compatibility changes.

Related to the physical connectivity requirements, it is also necessary to effectively gather input data from users of the system in order to respond within an acceptable time interval. Some interactive devices, such as web browsers and video cassette players, have less stringent requirements as applied to the time within which a response needs to be generated. On the other hand, some interactive devices have substantially greater Input rates and, in order to meet customer expectation, these devices require that relatively rapid responses be generated by the system and returned to the interactive devices. For example, players of video games do not want to experience delays that they are not responsible for when playing these games. Accommodations and balancing among these different interests associated with interactive devices must be made in order to achieve user acceptance without inefficient or wasteful use of system capability and system components.

It would be advantageous, therefore, to devise an entertainment/information system that facilitates the integration of present and future interactive devices into the system. In the ideal situation, essentially no adaptation of the system and/or interactive device is required. Rather, the version of the interactive device that is marketed to users through other distribution channels is the same version that is readily and effectively interconnected to the particular entertainment/information system.

SUMMARY OF THE INVENTION

In accordance with the present invention, a system is provided in which devices including interactive devices are integrated into the system while eliminating, or substantially reducing, system and/or interactive device modification to achieve the integration. The system includes a plurality of guest terminal subsystems. At least some of the guest terminal subsystems include one or more interactive input devices. These interactive input devices can include a keyboard, mouse, TV remote, video game stations or other input devices. Two or more of the interactive input devices require a different network communication/connection or interface, such as the following serial interfaces: asynchronous RS-485; asynchronous RS-232; and synchronous TTL.

Each of the guest terminal subsystems communicates with a head end system located remotely therefrom and electrically connected thereto using a distribution system. The head end system also includes a router apparatus that communicates with both the host and the guest terminal subsystems. The router apparatus communicates with an output device system that is comprised of a number of interactive output devices. The interactive output devices can include video games, web browsers and video cassette players, for example. The router apparatus is electrically disposed intermediate the host and the distribution system. Generally, inputs from the interactive input devices of the guest terminal subsystems are received by both the router apparatus and the host. The router apparatus includes a head end controller that has overall control of providing the inputs from the interactive input devices of the guest terminal subsystems to the proper interactive output device.

The head end controller communicates with a number of emulation assemblies. Each of the emulation assemblies is electrically connected to one of the output devices of the output device system. Each of such emulation assemblies is configured to properly communicate and function with the output device to which it is connected. In one embodiment, the emulation assemblies are only configured when they are manufactured and before shipment to their final destination. In another embodiment, each of the emulation assemblies is re-configurable at the user's site using host processing and software so that it can be made compatible with each interactive input device. By way of example, a first emulation assembly can be configured so that it is compatible with a first interactive input device and an associated first interactive output device. A second emulation assembly functions with a second interactive input device and a second interactive output device. The second emulation assembly can be re-configured so that it now is functionally compatible with the first interactive input and output devices, but is not compatible with the second interactive input and output devices. As can be appreciated, this flexibility or adaptability enables the router apparatus to be configured or customized for a particular lodging facility owner/operator, who might want different numbers and/or sets of output devices than another hotel or lodging complex.

Each emulation assembly has an input interface and an output interface. The input interface communicates with a router bus that includes a data line for carrying input information that is to be provided to interactive output devices of the output device system through the selected output interfaces of the appropriate emulation assemblies. In that regard, each emulation assembly input interface accepts only that data or other information that is specifically directed to it. The head end controller supplies an output device address unique to the particular output device that is to receive the designated information. Consequently, unless the input interface of the particular emulation assembly recognizes its address accompanying the current input data, it essentially ignores such data.

With regard to obtaining input information during the operations or workings of the input interactive devices, the head end system, particularly the host, initiates a series of interactive interrogations. Each interactive interrogation is directed to all active input devices in the system. Each interactive interrogation typically includes a number of slots and a number of subslots. Each slot has a predetermined time interval. In one embodiment, each slot has a time interval of $\frac{1}{60}^{th}$ of a second. Each subslot has a predetermined time interval that relates to a division of the slot time interval. For example, each subslot is a division of $\frac{1}{60}^{th}$ of a second (i.e., $\frac{1}{30}$, $\frac{1}{20}$, $\frac{1}{15}$, etc.). Each activated input device is assigned to a slot or subslot in a slot, which make up the interactive interrogation. Input data or information from an interactive input device is assigned a particular slot or subslot in a slot primarily based on the response time to be given to the particular input device. Generally, when an input device requires a relatively faster response time, it is given a slot assignment that enables the system to provide the fast response time. By way of example, when the input device is an interactive video game input device, because of the nature of the inputs being provided at a rapid rate by the player and the need to receive immediate responses, such an input device would be assigned to a particular slot. And, in the example where the slot has a $\frac{1}{60}^{th}$ time interval associated with it, the system would check for new input information from this interactive input device at $\frac{1}{60}^{th}$ of a second intervals. With respect to input devices that can be checked for inputs less frequently, they can be assigned a subslot within a particular slot. For example, accessing the world wide web using a web browser by means of a keyboard or mouse, typically involves less frequent or less rapid inputs by the user. Such an interactive input device could be assigned a first subslot in a particular slot. As an example only, there might be two subslots associated with a particular slot. For the first subslot in this slot, input information is provided by such an interactive input device during this first subslot time interval. For the second subslot of this particular slot, it is not utilized to receive any input from the input device that is assigned to the first subslot, but may receive input information from another input device that is assigned to the second subslot. In accordance with this example, updated input information is obtained for the input device having this subslot assignment at a rate one-half the rate that video game inputs are obtained. As can be appreciated, instead of two subslots in a slot, there could be three subslots, four subslots, and so forth. Relatedly, there can be multiple subslots, such as two subslots, during a particular interrogation or poll. One slot of the interrogation may have subslots based on a first time division of the slot and another slot might have subslots based on a different time division (e.g., $\frac{1}{30}$ v. $\frac{1}{15}$ of a second).

With respect to communications between input and output devices, as part of the communications operation, an interactive input device that will generate inputs during operation by its user will be assigned to a certain interactive output device of the output device system by the host. Additionally, this interactive input device will be assigned a slot or subslot by the host. The host conveys such assignment information to the head end controller. The host sends out a poll to the guest terminal subsystems including a series of interactive interrogations for use in receiving input information from currently activated interactive input devices. The interactive interrogation is received by the guest terminal subsystems by means of the distribution system. For each assigned slot and/or subslot in a slot, any input present from the interactive input device having such assigned slot or subslot is provided in that time interval of the assigned slot or subslot. A response by an interactive input device, which is found in its assigned slot or subslot, is received by the host and the head end controller. The host provides a "tick" or indication to the head end controller each time input information should be received by the head end controller from a slot or subslot. That is, a tick is generated when a poll message is sent by the head end controller and, therefore, a response is expected to be received to that poll message. The head end controller correlates slot or subslot information to a particular emulation assembly and output device connected thereto. Such correlation involves providing an address for the emulation assembly, together with the input information, and outputting it to the router bus. The emulation assembly that has the address associated with the input information receives such input information at its input interface. The emulation assembly formats the input information or data so that it is acceptable to the interactive output device connected to the output interface of the emulation assembly. The interactive output device receives this current or updated input information and acts on such information just as it would if it were connected directly to its associated interactive input device. In acting on this current input information, the interactive output device functions to generate an output that is to be sent back to the particular interactive input device. Such output information or data is transmitted through a modulator and subsequently to the distribution system and then to the guest terminal subsystem having the associated interactive input device. This interactive input device can then act on or reply to the updated information received from its associated interactive output device. This process or series of steps continues as the user or player provides further inputs and acts on responses or outputs from the particular interactive output device to which is connected the interactive input device being utilized by the user.

Based on the foregoing summary, a number of salient features of the present invention can be readily recognized. A system and methodology integrate different devices including interactive devices into a system that provides information and/or entertainment. Such a system can be conveniently installed in a hotel or other lodging complex. The system facilitates interconnection of such different devices, which can be available from a number of different manufacturers, without modifications to the host hardware and software. The system is scalable in that additional devices can be incorporated relatively easily at the head end. Likewise, for environments in which fewer output devices are required, the system accommodates such a reduced number of output devices. Relatedly, the system is adaptable to changes in the number and kind of output devices. In that regard, emulation assemblies can be re-configured to properly function with a different selected output device. Furthermore, the obtaining of input information is enhanced by efficiently using system bandwidth capabilities in the form of slot/subslot arrangements when input devices are polled. The system is also designed to provide relatively more rapid replies to those inputs requiring more immediate responses, such as inputs from video games.

Additional advantages of the present invention will become readily apparent from the following discussion, particularly when taken together with the accompanying drawings.

DETAILED DESCRIPTION

Figure 1:
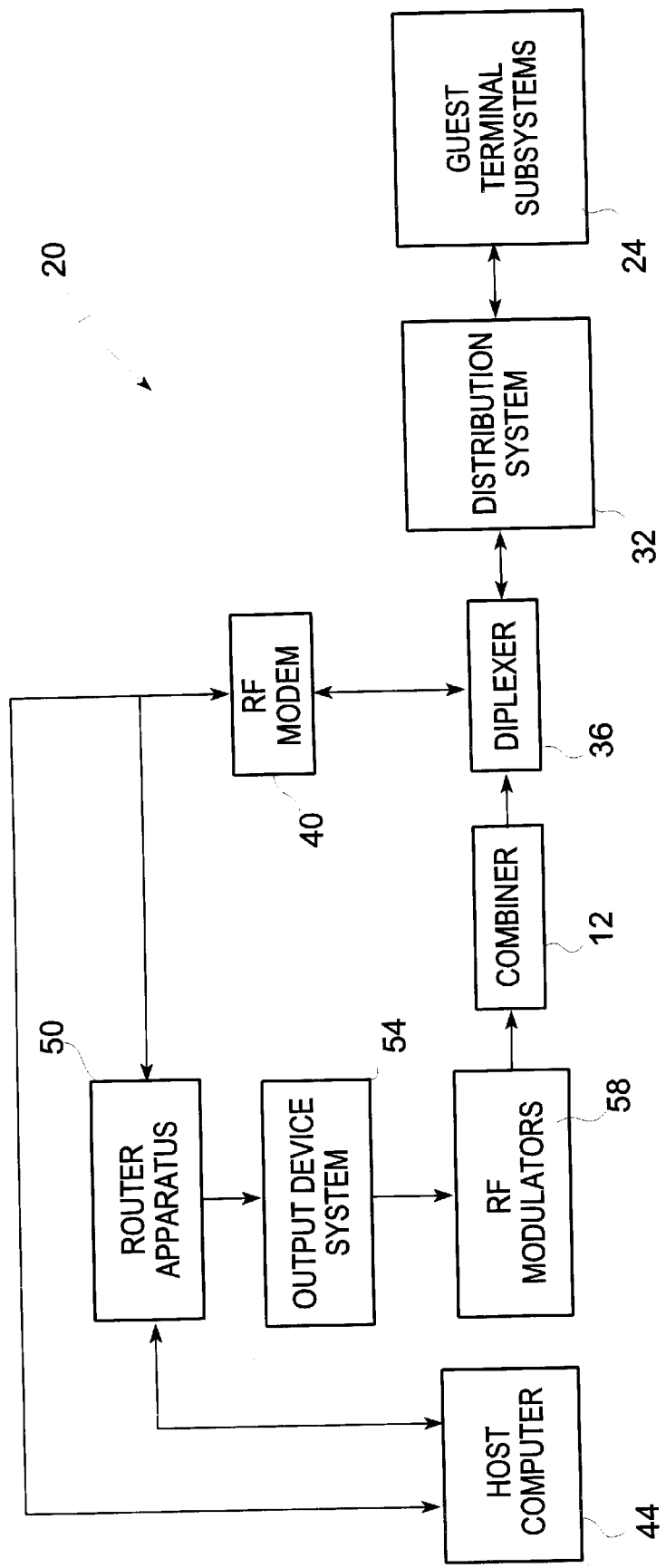
FIG. 1 illustrates a block diagram of major subsystems or components of the present invention.

With reference to FIG. 1, an entertainment and/or information system 20 is illustrated. The system 20 includes a number of guest terminal subsystems 24. Each guest terminal subsystem 24 is preferably located in a room of a hotel or other lodging complex, although such a guest terminal subsystem 24 could be provided in any kind of room. Each guest terminal subsystem 24 may have a number of entertainment and/or information accessing units including, for example, a television and/or computer/computer monitor and/or input devices including interactive devices such as: a keyboard, a mouse, a TV remote and/or a video game station. Each guest terminal subsystem 24, particularly using such units and/or devices is linked to a head end system 28 by a distribution system 32, which can be a two-way master antenna television (MATV) distribution system. The distribution system 32 comprises a coaxial cable network including amplifiers, splitters and taps in order to provide the two-way communication between the head end system 28 and the guest terminal subsystem 24.

The head end system 28 includes a diplexer 36, which enables two-way communication between the head end system 28 and the guest terminal subsystems 24 by routing a combined signal to the distribution system 32. Conversely, information or data signals from the guest terminal subsystems 24 are delivered from the distribution system 32 by the diplexer 36 to the components of the head end system 28.

The head end system 28 also includes a RF modem 40 in communication with the diplexer 36 for receiving the guest terminal information/data signals from the distribution system 32. The RF modem 40 demodulates such RF signals before passing them to other components of the head end system 28 for processing or other use. The RF modem 40 also modulates incoming signals, such as control signals from a host computer 44. The host computer 44 is responsible for overall control of the head end system 28 and has system management software controlling its performance in connection with operating the system 20. The functions and operations of the host computer 44 will be explained in greater detail later herein.

The head end system 28 also includes a router apparatus 50 for receiving inputs including interactive inputs generated by the guest terminal subsystems 24. The router apparatus 50 has major responsibilities in connection with controlling and enabling communications emanating from input devices of the guest terminal subsystems 24. The router apparatus 50 facilitates these communications and reduces the time within which outputs responsive to inputs from the guest terminal subsystems 24 are generated and sent back to the guest terminal subsystem 24. In particular, the router apparatus 50 eliminates hand shake delays involving the host computer 44 since such inputs need no longer be routed through the host computer 44 but are handled by the router apparatus 50. Relatedly, the router apparatus 50 eliminates the handling of the input data/information by host computer 44 software, which also reduces the time involved in responding to such inputs. The router apparatus 50 also avoids use of the communication path, which is typically an Ethernet path, that has previously been relied on in sending data. Instead, such an Ethernet path is only used for control information between the host computer 44 and the guest terminal subsystems 24, not for purposes of handling data associated with the input devices, such as keystroke data from a keyboard of a guest terminal subsystem 24. The router apparatus 50 controls and prepares the inputs it receives for application to an output device system 54. The output device system 54 comprises a number of output devices including interactive output devices. When an operation, which is associated with a particular input device is initiated, the router apparatus 50 is used to provide inputs from that particular associated input device of a guest terminal subsystem 24 to the corresponding or associated output device of the output device system 54. Generally, when a particular input device of a guest terminal subsystem 24 has been selected or enabled by user, the host computer 44 establishes a communication link between that particular input device and the associated output device that the user wishes to interact with or otherwise utilize.

Outputs from each of the output devices of the output device system 54 are transmitted to a corresponding one of a number of RF modulators 58. Each RF modulator frequency translates the received signal and provides the translated signal to a combiner 62. The combiner 62 additively combines each of the RF signals into a single complex signal and provides this combined signal to the diplexer 36. The diplexer 36 applies such signals from one or more of the output devices of the output device system to the proper guest terminal subsystem input device by means of the diplexer 36 and through the distribution system 32. Accordingly, output device signals in response to inputs from the activated input devices of guest terminal subsystems 24, are provided to the appropriate receiving unit, such as the television or computer monitor. Each such output device signal may result in additional interactivity involving the user at an enabled guest terminal subsystem 24.

Figure 2:
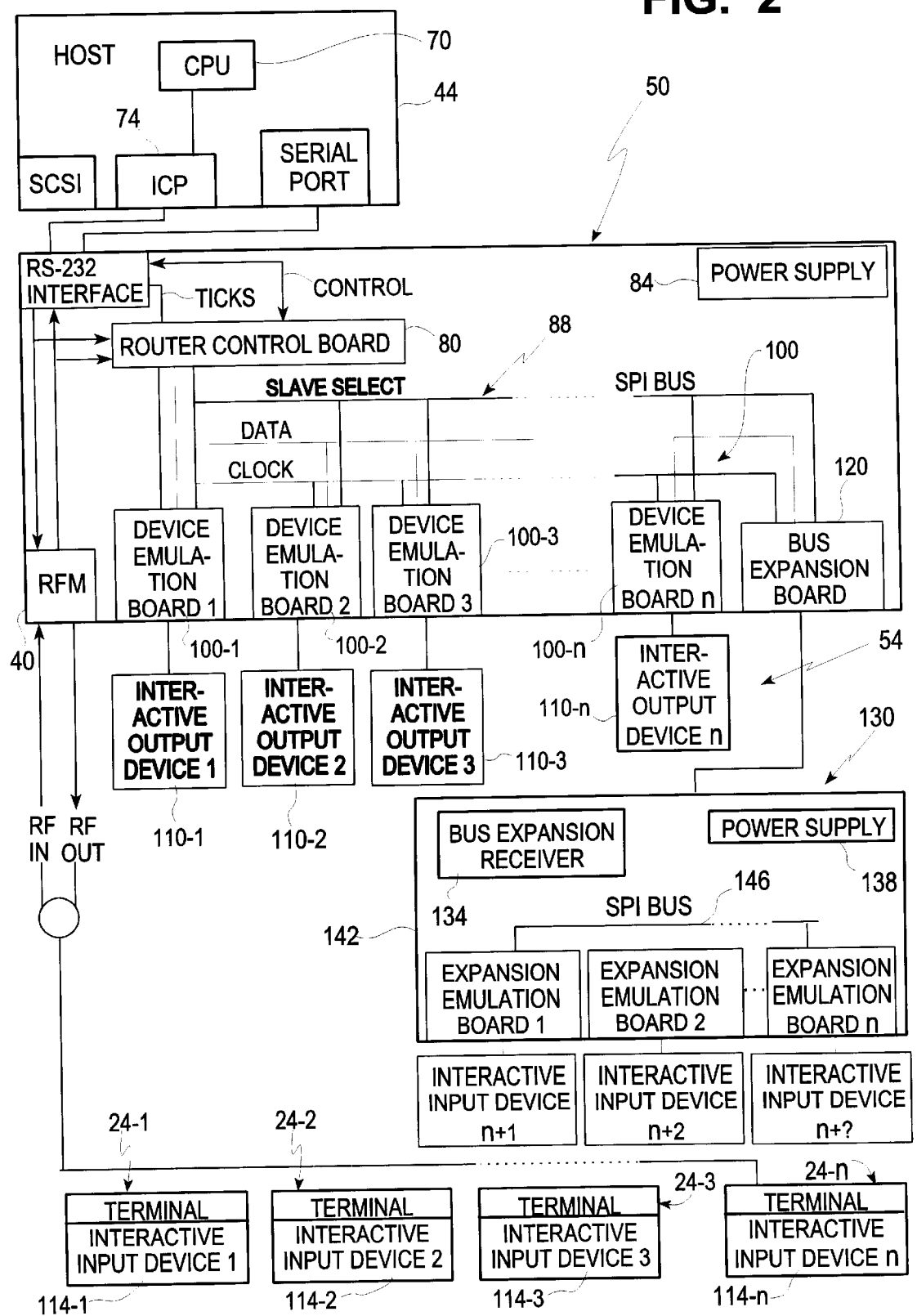
FIG. 2 illustrates a block diagram showing more details of the router apparatus.

With reference to FIG. 2., more detailed descriptions are next provided, particularly directed to the router apparatus 50, the host computer 44, together with the communications between the router apparatus 50 and the output devices of the output device system 54. As seen in FIG. 2, the host computer includes a central processing unit (CPU) 70 that is linked to an intelligent communications processor (ICP)74. The CPU 70 controls or executes a management system including programmable applications software located in memory, such as a hard disk drive. Such a management system manages the system 20 utilizing the ICP 74. The CPU 70 preferably operates under the control of the UNIX operating system. The intelligent communications processor 74 has an asynchronous receiver/transmitter (UART) and provides a communications link between the CPU 70 and the guest terminal subsystems 24. The ICP 74 generates, under control of the CPU 70, both system interrogations and interactive, including game, interrogations. The ICP 74 receives the interrogation responses from the guest terminal subsystems 24 and informs the CPU 70 when there is a change in status associated with a guest terminal subsystem 24. The interactive interrogations and responses thereto relate to the communications between interactive input devices of the guest terminal subsystem 24 and interactive output devices of the output device system 54. The system interrogations relate to communications between the host computer 44 and the guest terminal subsystem 24 involving overall system control and operations, such as checking for menu-related inputs from the guest terminal subsystem so that appropriate actions or responses can be taken by the host computer 44. The ICP 74 is electrically connected to the RF modem 40. The transmitter assembly thereof converts ICP polling data (system and/or interactive interrogations), which is sent to the guest terminal subsystems 24, from a digital signal to a RF signal that can be transmitted through the distribution system 32 to the guest terminal subsystems 24. The receiver assembly of the RF modem 40 receives RF data coming from the guest terminal subsystems 24 and converts the digital signals for processing by the router apparatus 50. In one embodiment, the RF modem 40 uses a 50 MHz transmitter and a 22 Mhz receiver. Each of these two assemblies is shielded to avoid any digital interference that might degrade the RF modem performance. The host computer 44 and the RF modem 40 preferably communicate with each other through a RS-232 interface.

The router apparatus 50 includes a head end controller or router control board 80 that includes a router CPU, which is responsible for controlling interactive inputs received from the guest terminal subsystems 24. The hardware and software of the router control board 80 formats such inputs into standard hardware inputs acceptable to the emulation assemblies 100. In that regard, the router control board 80 is also responsible for insuring that such data is addressed to the proper emulation assembly 100 for output to the proper interactive output device of the output device system 54. The router apparatus 50 is configured to enhance scalability whereby additional and/or new third party interactive output devices can be readily added or incorporated into the output device system 54. The router apparatus 50 also provides the inputs to such output devices with minimal latency since such inputs need not be processed or otherwise handled by the host computer 44. The router apparatus 50 also includes a universal power supply 84 that can be used internationally. The power supply 84 includes a power cord interface that can be used to support various international power plug ins.

The router control board 80 communicates with the emulation assembly 100 through asynchronous serial peripheral interface (SPI) or router bus. The SPI includes a slave select line, a data line and a clock line. When data is to be sent to the emulation assemblies 100, the slave select line is controlled or changed to indicate that data is to be sent. The data is sent over the data line in accordance with a predetermined state or polarity of the clock line.

The router apparatus 54 also includes a number of emulation assemblies or boards 100 that provide the proper communication links between the interactive output devices of the output device system 54 and the input data from the SPI 88. The emulation assembly or device emulation board 100 is dedicated to a particular interactive output device 110 of the output device system 54. Each emulation assembly 100 is able to support at least the following standard serial physical interfaces, with a logical application being behind each such physical interface:

| Physical Interface | Logical Application |
| --- | --- |
| Asynchronous RS-485 | Video game engine |
| Asynchronous RS-232 | Serial mouse |
| Asynchronous TTL | AT keyboard |

In one embodiment, the emulation assemblies 100 are configured when they are manufactured and/or assembled, and before installation at a particular site or ultimate destination. In another embodiment, the emulation assemblies 100 ca also be configured or re-configured using the host computer 44. Each emulation assembly 100 also incorporates reprogrammable hardware that allows it to be upgraded to support other logical applications using the associated physical protocols. This modular design of the router apparatus 54 enables other emulation assemblies to be developed and added later to the system 20 for supporting other types of physical protocols.

With respect to interactive interrogations and responses thereto, each guest terminal subsystem 24 that has requested a particular interactive output device 110 is instructed concerning the identification of a polling slot assignment. The particular interactive input device 114 of a guest terminal subsystem 24, through its request, is slaved to an appropriate interactive channel that includes the particular interactive output device 110 that it wishes to access or use. In one embodiment, the ICP 74 transmits a multiplexed poll approximately every $\frac{1}{60}$th of a second. All guest terminal subsystems 24 receive this poll. However, only those with slot assignments provide a response. In that regard, each guest terminal subsystem 24 including any enabled interactive input device 114 receives the poll and waits for special RSVP characters (e.g. $F1). The guest terminal subsystem 24 that is assigned to slot 1 of the multiplexed poll responds after receiving the first RSVP. The guest terminal subsystem 24 assigned to the second slot of the multiplexed poll responds after the second RSVP and so forth. This polling methodology at a predetermined time of $\frac{1}{60}$th of a second has particular utility where the combination of the interactive output device 110 and the interactive output device 114 involves relatively fast input times and, therefore, requires relatively faster outputs from the interactive output device 110 to the interactive input device 114. For example, video games ("twitch" games) require rates at or near the 60 times per second. On the other hand, other applications, such as use of an Internet browser, require lower polling rates. Based on this requirement, one or more additional levels of multiplexing are included to avoid wasting the communications bandwidth due to excessive polling of the guest terminal subsystems 24, which have enabled interactive input devices 114 with relatively slower input rates. To handle these interactive input device and interactive output device combinations, one or more subdivisions of the predetermined time slot is employed. By way of example, the $\frac{1}{60}$th of a second time slot is divided into subslots based on a power of two. In one example, each time slot can be subdivided by four so that a particular slot has four subslots. In implementing such subdivision, the ICP 74 is instructed by the host computer 44 to serialize the outbound multiplexed poll packet based on the subdivision, such as a subdivision by four. For those guest terminal subsystems 24 associated with a lower order or less rapid response time interactive application, they are assigned subslots in addition to their slot assignment when slaved to a particular interactive output device 110. Such guest terminal subsystems 24 having subslot assignments process the multiplexed poll and prepare a response only when there subslot assignment matches the outbound multiplex poll. As an example of slotted and subslotted polling in the context of three different guest terminal subsystems 24 responding to a multiplexed poll, reference is made to FIG. 3. In this example, a first guest terminal subsystem 24 has player 1 playing a video game using interactive input device 114a and interactive output device 110a. An interactive user 1 at another guest terminal subsystem 24 is using interactive input device 114b in communicating with an interactive output device 110b. Such an interactive output device 110b might include an Internet browser. Interactive user 2 is using interactive input device 114c at still another guest terminal subsystem 24c. This interactive input device 114c is slaved to interactive output device 110c. The interactive output device 110c might also be an Internet browser.

Figure 3A:
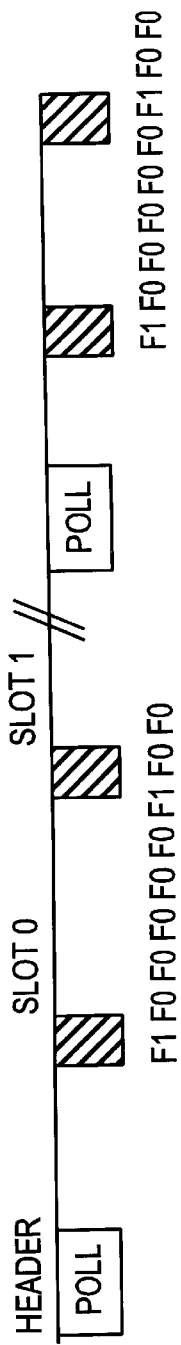
FIGS. 3A–3D illustrate timing diagrams related to obtaining input information using slots/subslots of interactive interrogations.
Figure 3B:
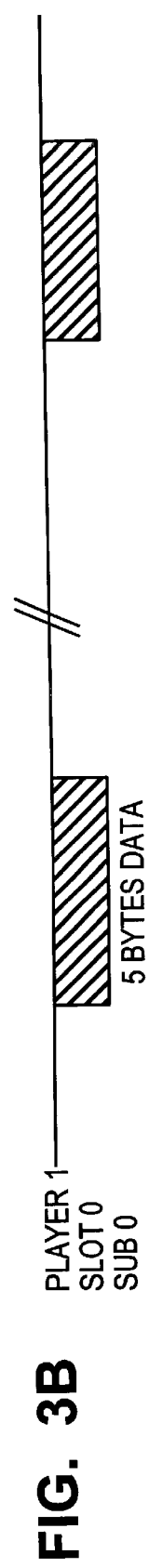
Figure 3C:
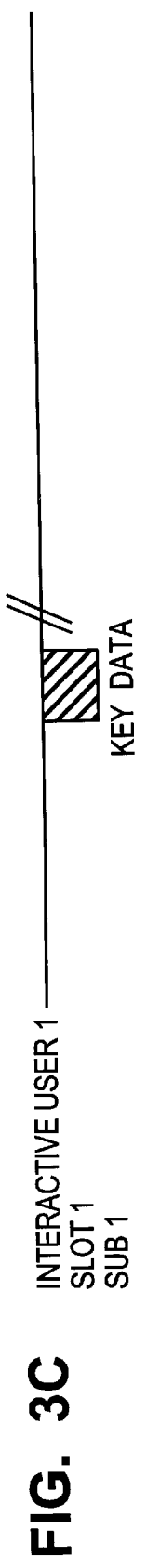
Figure 3D:

A multiplexed poll, as illustrated in FIG. 3A, is transmitted by the ICP 74 through the distribution system 32 to the guest terminal subsystems 24. The multiplexed poll is comprised of a number of slots, such as slot 0 and slot 1. Each of the slots has at least two subslots. FIG. 3B illustrates player 1 providing response data in the assigned slot 0. Interactive user 1 provides response data in subslot 1 of slot 1, as illustrated in FIG. 3C. Interactive user 2 provides response data in subslot 2 of slot 1, as illustrated in FIG. 3D. This means that during one poll, such as a first poll, interactive user 2 does not provide any data since interactive user 1 is using that slot at that particular time period. By way of further example, if the poll is sent 60 times per second, then player 1 responds 60 times per second using slot 0. Further assuming a subdivision of four of the subslotted slots, interactive user 1 responds in the first subslot of slot 1 and would respond 60/4 or 15 times per second. Likewise, interactive user 2 responds during slot 1 at 60/4 or 15 times per second, but at different 15 times per second intervals than interactive user 1.

Returning to FIG. 2, a further description of each emulator assembly is provided. Each device emulation board 100 replaces an input device that is part of an interactive or other user enabled system. Such input devices can include a keyboard or mouse used with a personal computer (PC), a game controller used with a video gaming console, or a stream of serial data to any interactive device or group of interactive devices. Each emulation assembly 100 is able to support RS-485, RS-422, RS-232 and TTL type data transmissions. TTL can be used to support keyboard emulations. RS-232 can be used if a mouse or some other serial port interactive device is used. RS-485 can be used with a gaming console, for example. In one embodiment, the type of transmission from the output of a particular emulation assembly 100 could be set and changed through a menu on the host computer 44. Each transmission type requires a specific wire harness so that the proper output signals from the particular emulation assembly 100 can be properly provided to the selected interactive output device 110. In one embodiment, the router apparatus 50 has five device emulation boards 100, with each having two outputs. The firmware for the device emulation boards 100 is loaded at the time of manufacture. Each device emulation board 100 is configured with the correct data transmission type and has the correct wire harness installed during manufacturing of the system 20. All of the emulation assemblies 100 are daisy chained together by a wire harness that will carry the SPI or router bus 88 and power from the power supply 84 to each of the emulation assemblies 100. The following chart identifies the signal and number of conductors used by such different data transmission types:

|  | RS-485 | RS-422 | RS-232 | TTL |  |
| --- | --- | --- | --- | --- | --- |
| Signals: | diff. A | diff. A | data out | data out |  |
|  | diff. B (Txd)* | diff. B (Rxd)* | data in | data in clk |  |
| Number of conductors | 2 | 2 | 2 | 3 | Gnd |
| Min. Required conductors | 10 |  |  |  |  |

It should be noted that the RS-422 uses the RS-485 lines for transmit and RS-422 line as a receive for full duplex.

In conjunction with the router control board 80 receiving input data from the guest terminal subsystems 24 and providing it to the emulation assemblies 100, when an interactive session occurs that involves one or more interactive output devices 110, the host computer 44 notifies the router control board 80 regarding which interactive output device 110 is to be used and its poll slot or subslot assignment for the guest terminal subsystem 24 including its interactive input device 114. The router control board 80, particularly its CPU, monitors outbound poll messages from the ICP 74 and waits for the returned multiplexed poll. In connection with notification of transmission of a RSVP character, the router control board 80 receives a notification input or "tick" from the ICP 74 for each guest terminal subsystem 24 that is expected to respond to the interactive interrogation or poll. The tick informs the router control board 80 as to when to expect a response from each applicable guest terminal subsystem 24. Upon receipt of such data, the router control board 80 checks to determine if the data is valid. The valid data is then sent out to the correct emulation assembly 100 using the SPI bus 88. In that regard, each emulation assembly 100 is assigned an address on the SPI 88 so that the router control board 80 can send the data to the correct location or entity on the router bus 88. The emulation assembly 100 receives such data at its input interface. The particular emulation assembly 100, particularly its CPU, processes the data and sends it from its output interface to its associated or connected interactive output device 110 in the correct data format and proper transmission type.

With respect to further information concerning the processing and operation of the router control board 80, when returned poll data is received, it switches control circuitry so that its UART is connected to the return data path from the guest terminal subsystems 24. The poll message includes a data byte indicating this poll's subslot number. The CPU of the router control board 80 includes memory for storing an internal look up table of slot, subslot and output device assignments. This table is built based on data received from the host computer 44 via the serial control link. The router control board 80 reads the data returned from the guest terminal subsystems 24 and accesses the table in memory in determining where the data is to be sent. The router control board 80 changes the state of the slave select line, such as to a binary zero. It then sends a byte indicating the output device address (which has a corresponding emulation assembly 100), followed by four bytes of data and a checksum. This data is sent to the emulation assemblies 100 by means of the SPI 88. The emulation assemblies 100 are triggered by the falling of the slave select line. Each of the emulation assemblies 100 checks the first byte to determine if the address therein matches its hardware placement address. If there is no match, each such emulation assembly 100 counts four more bytes received and again checks the address. If any of the addresses match a particular emulation assembly 100, it continues to read and store the next four bytes and processes the data into the output that is required for its connected or corresponding output device 110. Further descriptions related to such processing and communications will be provided later herein.

In a preferred embodiment, the router apparatus 50 also includes a bus expansion board 120. The bus expansion board is connected to the SPI 88. The bus expansion board 120 adds more outputs to the router apparatus 50 and allows more output devices to be installed at the head end of the system 20. Specifically, the bus expansion board 120 is electrically connected to a modified or limited capability router subassembly 130. The router subassembly 130 has a bus expansion board receiver 134, a power supply 138, and a number of emulation assemblies or device emulation boards 142 that communicate with the bus expansion receiver 134 through a separate SPI 146. The router subassembly 130 does not include a router control board or any hardware comparable thereto. The number of bus expansion boards 120, together with associated router subassemblies 130, can be added as part of the system 20 until the required polling associated with such emulation assemblies 100 and corresponding output devices 110 results in unwanted slowing down or inefficiencies in completing other host computer functions.

Additional descriptions are now provided related to communications involving the hardware of FIG. 2. The router apparatus 50, by means of the router control board 80, has only one command that originates from it to the host computer 44. This command is identified as an initialize request command. This command informs the host that it needs to have route assignments initialized, with such routes related to establishing the correspondence or assignment between each input device 114 of a guest terminal subsystem 24 and a particular output device 110 of the output device system 54.

The host computer 44 invokes a number of commands to the router apparatus 50. The host computer 44 utilizes an input router command such as a keystroke input provided by a particular interactive input device 114. This command instructs the router control board 80 as to the identification of each emulation assembly 100 that is to receive a response to the interactive interrogation or polling. This enables the router control board 80 to be aware of the identity of the emulation assembly 100 to which a particular response must be sent. This command is configured as follows:

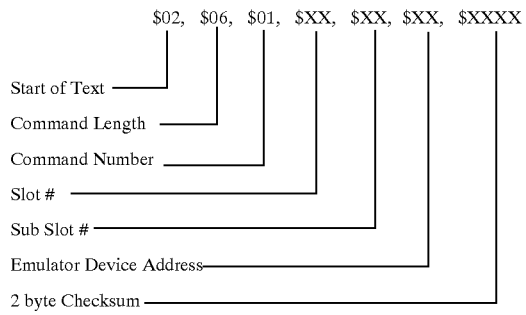

If this command is successfully received, the router control board 80 responds with an acknowledge designation. If the router control board 80 does not successfully receive the command within a certain period of time, the host computer 44 retries the command. A subslot assignment of zero indicates 10 the emulation assembly being addressed is communicating with a non-subslotted device, e.g., a video game device or engine.

Another host computer 44 command to the router apparatus 50 is an emulation assembly key map command by which the addressed emulation assembly 100 is instructed to set up/change its key maps. The data packet for such a command is arranged as follows:

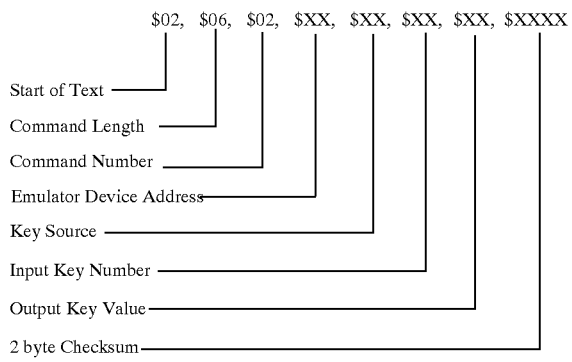

The host computer 44 also has an assignment query command directed to the router apparatus 50. The host computer 44 uses this command to determine the identity of the emulation assembly 100 that is assigned to a given slot and/or subslot. This command is identified as follows:

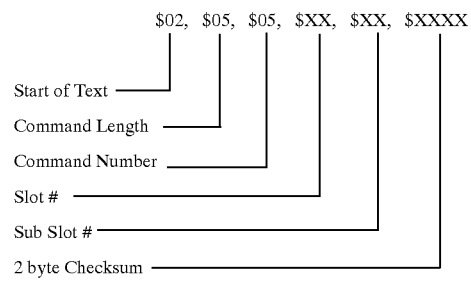

If this command is successfully received, the router control board 80 responds with the following:

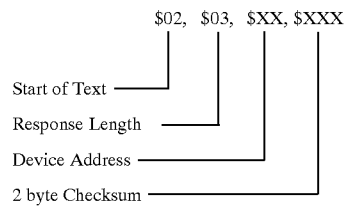

Still another command from the host computer 44 to the router apparatus 50 can be defined as a multiple route command. This command is similar to the input route command involving a single route assignment, but differs in that this command instructs the router control board 80 regarding multiple route assignments that, in one embodiment, can include a maximum of 84 sets. This multiple route command is formed by the following information packet:

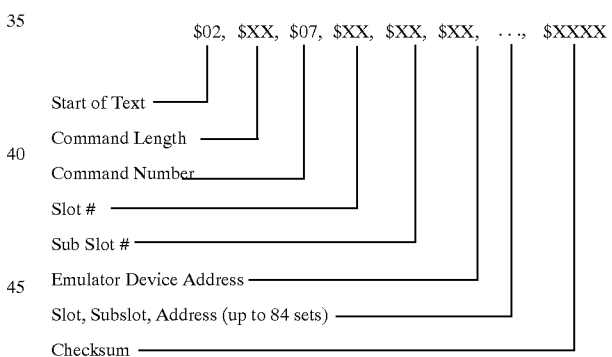

A further host computer 44 command to the router apparatus 50 is a query route table command. The host computer uses this command to obtain the current information regarding the makeup of the route table. In one embodiment, the route table of the router control board 80 is 16 slots ×12 subslots deep. This command is configured as follows:

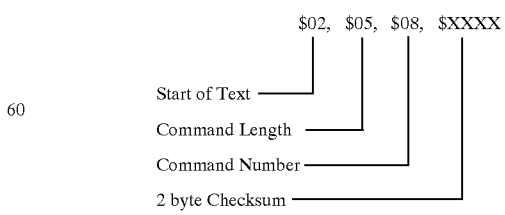

If the command is successfully received, the router control board 80 responds with the following:

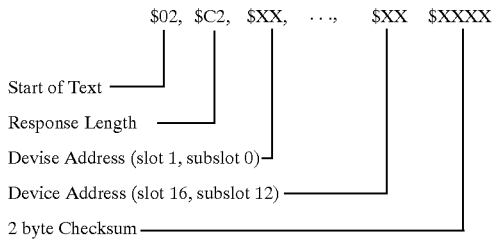

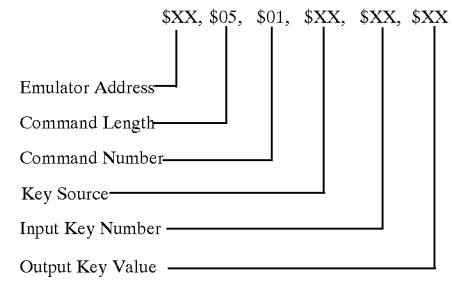

Additional host computer 44 commands include: a router control board 80 firmware version and revision command that the host computer 44 uses to find out the firmware version and revision of the router control board 80; an emulation assembly 100 firmware version and revision command so that the host can obtain a single emulation assembly's firmware version and revision; and a system check command that the host can use to determine if the router apparatus 50 has detected any hardware errors.

The next set of communications to be described relate to those from the router control board 80 to the emulation assemblies 100. The CPU of the router control board 80 communicates with the CPU of the emulation assembly 100 via the synchronized SPI or router bus 88. The router control board 80 initiates all communications and controls the data transmissions to the emulation assemblies. The communication is started by the CPU of the router control board 80 changing the state to a logic zero, or pulling down, the slave select line. This indicates to the emulation assembly 100 that it will receive a message. There are two types of messages that the router control board 80 sends to the emulation assemblies 100. The first is a command type of message and the second is an input data stream message. The router control board 80 indicates the message type by the level of the data line when the slave select line is pulled down.

Figure 4:
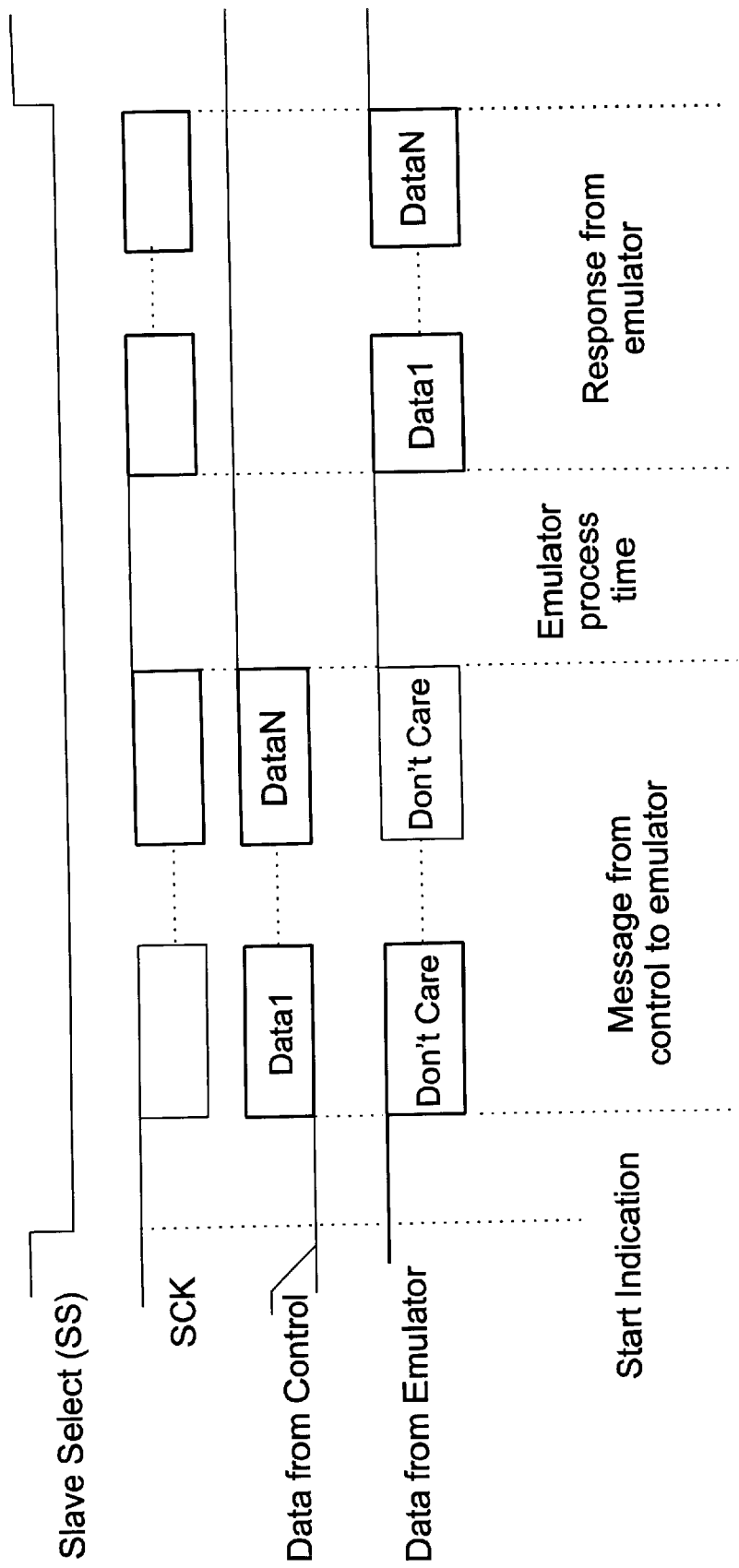
FIG. 4 illustrates timing diagrams related to a command message sent to an emulation assembly.

Regarding the command type message, it is a message addressed to a single emulation assembly 100 and requires a data message response to be sent back to the router control board 80. These messages include downloading of key maps and version/revision and responses. With reference to FIG. 4, a command message begins when the router control board 80 holds its data out line to ground while bringing the slave select line to ground. After a predetermined time interval, the router control board 80 sends out the command packet. All SPI 88 transfers are accomplished with the clock polarity (CPOL) equal to one and the clock phase (CPHA) equal to one (i.e. CPOL=1, CPHA=1). The router control board 80 allows the emulation assembly 100 to process the command and in a predetermined time interval, the router control board 80 clocks the response back. This response depends on the outbound command. Upon completion, the router control board 80 brings the slave select line back high, thereby indicating the end of the command, as further illustrated in FIG. 4.

With respect to a key map command that can be sent by the router control board 80, an addressed emulation assembly 100 can be instructed to set up/change its key map by means of the following configured command:

Other commands to particular addressed emulation assemblies 100 include a version and revision command by which the host computer 44 determines the addressed emulation assemblies firmware version and revision and a report error(s) command by which the host computer 44 can query the identified emulator assembly 100 for any errors.

Figure 5:
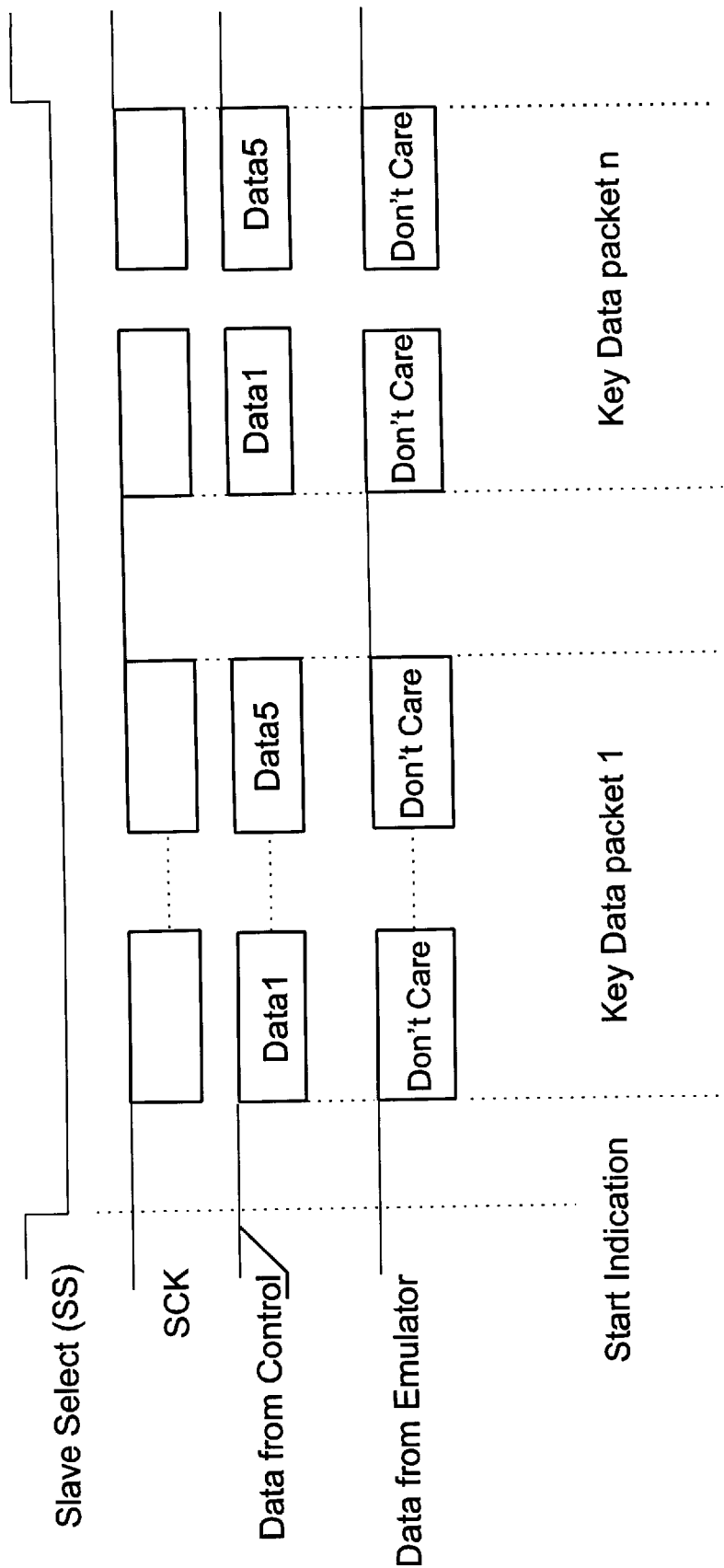
FIG. 5 illustrates timing diagrams related to a data message to emulation assemblies.

Referring next to data messages to the emulation assemblies 100, such a message stream contains input data received form the guest terminal subsystems 24. An input data message begins with the router control board 80 holding its data out line high (logical one state) while bringing the slave select line to ground. After a predetermined time, the router control board 80 sends out the input data message stream. The SPI 88 transfers are done with the clock polarity (CPOL) equal to 1 and the clock phase (CPHA) equal to one (CPOL=1, CPHA=1). The input data stream has groups of five bytes of data. These five bytes of data are the address of the emulation assembly 100 being accessed followed by four bytes of input data that are returned from the particular guest terminal subsystem 24. The number of five byte groups will depend on the number of slots associated with the multiplexed polling. For example, an emulation assembly 100 connected to or associated with a particular video game output device monitors all packets from the router control board 80 to determine whether or not its address is present, since it may expect multiple player responses. In such an embodiment, for each slot of the multiplexed poll that is not addressed to such emulation assembly 100, it sends idle characters to the output device. Each of the other emulation assemblies 100 assumes only one packet per packet stream and stops monitoring the incoming data after it receives its addressed data. After completion of a particular packet data stream, the router control board 80 brings the slave select line back high thereby indicating the end of this particular data stream, as illustrated in FIG. 5.

With regard to more information concerning input data packet streams, they consist of multiple input data packets. The number of packets depends upon the number of multiplexed poll slots. Each packet includes an emulation assembly address byte followed by four bytes of input data. The input data contents are dependent on the type of interactive input device 14 of the guest terminal subsystem 24 that is responding. In one embodiment, there are two types of input data, namely, game play input packet data and subslotted input packet data.

The first embodiment is in response from a non-subslotted terminal. This response is typically intended for the "twitch" game play and contains a mask of the key positions:

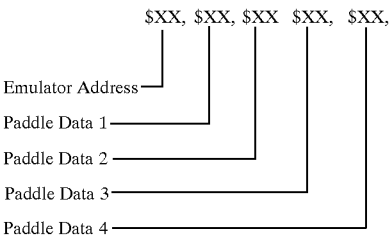

In a second embodiment, the terminal has a subslot assignment that indicates a lower level polling. The terminal will compare the address byte 3 to it's assigned subslot poll. If they match the terminal will respond with the following:

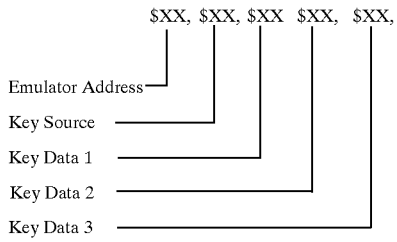

The key source field indicates the in-room device from which the key data originates. The current key sources are:
1=Local Keypad
2=Standard remote
3=Maid Remote
4=Technician Remote
5=Maid Remote
6=Game Paddle
7=IR keyboard Referring now to subslotted input packet data, such a data packet is provided by a guest terminal subsystem 24 having a subslot assignment associated with its interactive input device 114. The subslot assignment indicates lower level polling. Such a guest terminal subsystem 24 provides input data packet that results in the following being sent to the particular emulation assembly 100 by the router control board 80:

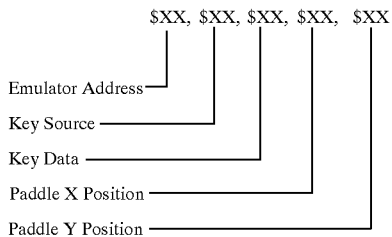

The key source field indicates the interactive input device 114 from which the input data originates. In one embodiment, such input sources can be identified as: local keypad, standard remote, maid remote, technical remote, game panel and IR (infrared) keyboard.

Data results are sent from the emulation assemblies 100 to the output devices 110. In particular, each active output device 110 receives a data packet from its associated emulation assembly 100 to which it is connected or dedicated. Such data is in the form of data signals that are acceptable to or compatible with the particular output device 110. The output data packet from the emulation assembly 100 to which the output device 110 is connected is equivalent to that packet required by the particular output device 110, if this particular output device 110 were directly connected to its associated interactive input device 114, and not indirectly connected by means of the distribution system 32, as well as the router control board 80 and the associated emulation assembly 100.

One example of an interactive output device 110 is one that accepts PC/AT keyboard scan codes. The emulation assembly 100 that is associated or connected to this interactive output device 110 has tables to translate keys received from the particular guest terminal subsystem 24 into the keyboard scan codes. Such an emulator assembly 100 will have the capability to remap keys as needed or desired.

Further communications to be discussed relate to those from the host computer 44 to the ICP 74 and to the guest terminal subsystems 24. One such communication to the ICP 74 is a command from the CPU 70 of the host computer 44 to initiate a high speed multiplexed interactive polling or interrogation. This command takes affect only if the ICP 74 is currently in the standard polling state (system interrogation) or can be used to change the number of slots and/or subslots. This command packet can be identified by the following fields and information:

| 0–1 | 0 | 11 | Packet Length |
|---|---|---|---|
| 2 | 11 | | Class & Command (00/17) |
| 3 | 0 | | Command Indicators |
| 4 | 0 | | Spare |
| 5–11 | 0 ⋯ 0 | | N/A |
| 12–13 | 0 | 0 | Error Code/Number |
| 14–15 | # | # | N/A |
| 16 | # | | Number of Slots |
| 17 | # | | Number of Subslots |

In one embodiment, the number of slots is the number of 1/60th of a second slots in the multiplexed poll. The number of subslots indicates two levels of subslotting. The upper nibble indicates the number of level A subslots (which corresponds to the number of devices in that subslot) and the lower nibble indicates the number of level B subslots (which corresponds to the number of devices in that particular subslot).

The host computer 44 also communicates with guest terminal subsystem 24 that include a television. The host computer 44 utilizes a write TV control command. In connection with subslotted polling, such a command includes a data byte that contains the guest terminal subsystem 24 subslot assignment for the guest terminal subsystem 24 having the particular television.

A further aspect of the router apparatus embodiment relates to the manner by which the ICP 74 communicates with the guest terminal subsystems 24. In particular, such a communication includes an address of the guest terminal subsystem 24 to which the particular communication is directed. As part of this form of communication, the CPU 70 of the host computer uses a registered guest terminal address command to instruct the ICP 74 regarding the identities of the guest terminal subsystems 24 that are to be polled. Once the ICP 74 receives this command, it switches to poll by address protocol. More specifically, this command is sent to the ICP 74 to register the guest terminal subsystem address into the ICP internal polling table. Such a command packet is configured by the following command packet fields:

| 0–1   | 0   | 11  | Packet Length          |
|-------|-----|-----|------------------------|
| 2     | 14  |     | Class & Command (00/20)|
| 3     | 0   |     | Command Indicators     |
| 4     | 0   |     | Spare                  |
| 5–11  | 0 --- 0 | | N/A                |
| 12–13 | #   | #   | Error Code/Number      |
| 14–15 | #   |     | GT Polling/System Index|
| 16–18 | #   |     | Guest Terminal Address |

With regard to further information concerning the interactive polling using guest terminal subsystem addressing, such a guest terminal subsystem address consists of a two bit control field and a 22 bit terminal address field. The control field of two bytes constitutes the most significant bits of the guest terminal subsystem address. A 0 in the most significant bit indicates that the terminal address field contains a terminal address. A 1 in the most significant bit indicates that the terminal address field contains a global address. The second most significant bit depends on whether the message is a command to the guest terminal subsystem 24 to perform a task or if the message is a poll requesting information from the guest terminal subsystem 24. The guest terminal subsystem 24 can determine a command from a poll by the most significant bit of the command field. If the message is a poll, this bit is zero when the data from the last poll was not received and is a one if the data from the last poll was received. If the message is a command, then this bit is zero if the command does not need to be acknowledged by the guest terminal subsystem 24, while a one indicates that the command is to be acknowledged.

The terminal address field is 22 bits in length with a maximum polling address capability of 4,194,303. The first type of address is terminal specific and is identified using the control fields. The second type of address is global and is defined using the same control field. When the message is global, the terminal address field may contain further addressing. In the case of multiplexed subslotted polling, this field may contain a subpoll number that provides an indication as to which interactive input devices 114 are to respond to this particular poll.

The ICP 74 transmits a standard or system poll or interrogation to each guest terminal subsystem 24. In one embodiment, such a poll packet is defined as follows:

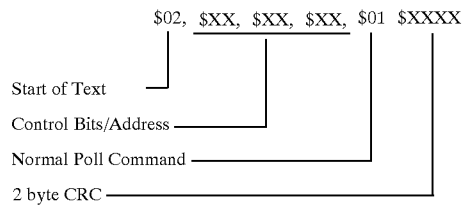

A guest terminal subsystem 24 receiving such a poll responds with either a simple acknowledge, if nothing has changed within the guest terminal subsystem 24 since the last poll. If a change has occurred, this guest terminal subsystem 24 responds with a standard poll response.

The ICP 74 also transmits the multiplexed subslotted poll (interactive interrogation) to the guest terminal subsystems 24. Such a poll packet can be defined by the following fields and identified information:

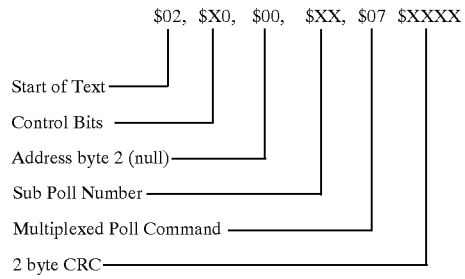

The subpoll number indicates the identity of the subslot for which this particular poll is seeking any current input. The upper nibble indicates a level A subslot poll number, while the lower nibble indicates a level B subslot poll number. All guest terminal subsystems 24 process such a poll command. However, only certain guest terminal subsystems 24 that have multiplexed slot indexes assigned respond to such a poll command. The response differs slightly if the guest terminal subsystem 24 has also been assigned a subslot index.

In an example in which the interactive input device 114 of the particular guest terminal subsystem 24 being polled does not have a subslot index, a guest terminal subsystem 24 having this active input device 114 responds with the following packet during its assigned time slot:

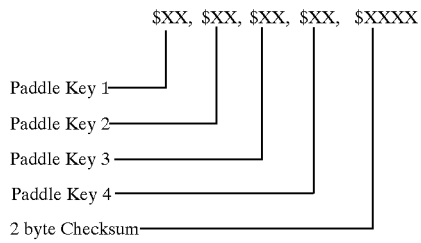

In another example in which the guest terminal subsystem 24 does have a subslot assignment that indicates a lower level polling, this guest terminal subsystem 24 compares the address byte 3 to its assigned subslot poll. When they match, this guest terminal subsystem 24 responds with a data packet identified by the following fields:

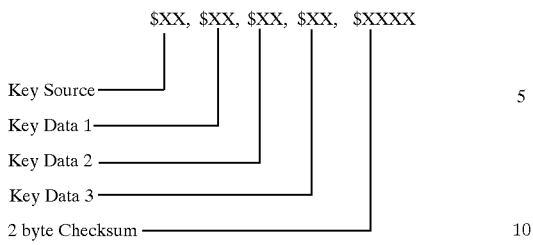

The key source field indicates the guest terminal subsystem interactive input device 114 from which the input data originates. Current input sources are identified as: local keypad, standard remote, maid remote, technician remote, game paddle and IR (infrared) keyboard.

The following data packet is sent to the game array via a RS-485 interface. For each multiplexed poll a 2 byte start header is sent followed by the following data packet(s). If the device address of the slot does not match the game emulator device slot then a idle data packet must be sent to the game array. This maintains slot assignment of the game engines.

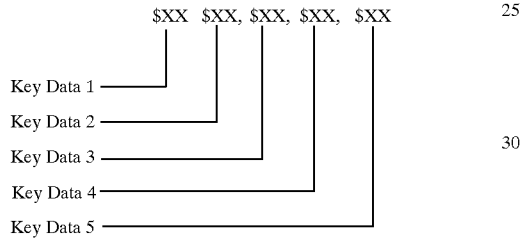

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for use with a plurality of rooms, comprising:
a plurality of guest terminal subsystems that include a plurality of interactive input devices comprising at least first and second interactive input devices that are different from each other;
a head end system including a router subsystem and a plurality of interactive output devices comprising at least first and second interactive output devices that are different from each other, said router subsystem including a plurality of emulation assemblies comprising at least first and second emulation assemblies, said first emulation assembly being properly responsive to first input information from said first interactive input device and not properly responsive to said second input information from said second interactive input device, said second emulation assembly being properly responsive to said second input information from said second interactive input device and not properly responsive to said first input information from said first interactive input device such that, when said first emulation assembly is dedicated to each of said first interactive input device and said first interactive output device, said first emulation assembly is unable to properly communicate with said second interactive input device and said second interactive output device and, when said second emulation assembly is dedicated to each of said second interactive input device and said second interactive output device, said second emulation assembly is unable to properly communicate with said first interactive input device and said first interactive output device, said first emulation assembly having a first data transmission type that allows said first input information to be communicated to said first interactive output device, with said first transmission type being unable to communicate said second input information to said second interactive output device and said second emulation assembly having a second data transmission type, different from said first data transmission type, that allows said second input information to be communicated to said second interactive output device, with said second data transmission type being unable to communicate said first input information to said first interactive output device; and
a distribution system electrically connected to said plurality of guest terminal subsystems and said head end system.

2. A system, as claimed in claim 1, wherein:
said router subsystem includes a head end controller and said head end system includes a host different from, and in communication with, said head end controller.

3. A system, as claimed in claim 2, wherein:
said host is responsive to a first guest terminal subsystem of said plurality of guest terminal subsystems to assign said first interactive output device to said first interactive input device, said host providing command information to said head end controller related to assigning said first interactive output device to said first interactive input device.

4. A system, as claimed in claim 1, wherein:
said first and second data transmission types are included in the following: asynchronous RS-485, asynchronous RS-232, and asynchronous TTL.

5. A system, as claimed in claim 1, wherein:
said head end system includes a host for providing system interrogations and interactive interrogations to said plurality of guest terminal subsystems, said plurality of guest terminal subsystems including first and second guest terminal subsystems, said first guest terminal subsystem responding to at least a first set of said interactive interrogations and said second guest terminal subsystem responding to at least a second set of said interactive interrogations, said first guest terminal subsystem responding to said first set of said interactive interrogations by sending input information using said distribution system at a first transmission rate and said second guest terminal subsystem responding to said second set of interactive interrogation by sending input information using said distribution system at a second transmission rate, said first transmission rate being greater than said second transmission rate and said first set of interactive interrogations includes said second set of interactive interrogations.

6. A system, as claimed in claim 1, wherein:

said router subsystem includes a head end controller and a memory, said memory storing correlation information associating at least said first interactive input device with said first interactive output device, wherein said head end controller controls sending said first input information to said first interactive output device using an address of said first interactive output device.

7. A system, as claimed in claim 1, wherein:

said first emulation assembly translates said first input information to input interactive signals compatible with said first interactive output device based on said first data transmission type.

8. A method for obtaining and using information in a system that includes a plurality of guest terminal subsystems including at least first and second guest terminal subsystems with first and second interactive input devices, respectively, that are different from each other and first and second interactive output devices being in communication respectively therewith that are different from each other, comprising:

providing a first set of interactive interrogations and a second set of interactive interrogations, at least said first set being defined to include at least a first slot and a first subslot and at least said second set being defined to include said first slot, said first and second sets of interactive interrogations being provided at different times and with said second set of interactive interrogations being the next set of interactive interrogations provided after said first set of interactive interrogations;

receiving first input information from said first interactive input device in said first slot of said first set of interactive interrogations;

receiving second input information from said second interactive input device in said first subslot of said first set of interactive interrogations;

sending said first set of interactive interrogations for use of said first and second input information by said first and second interactive output devices, respectively;

using said first input information to change an output of said first interactive output device;

using said second input information to change an output of said second interactive output device;

receiving third input information from said first interactive input device in said first slot of said second set of interactive interrogations and not receiving input information from said second interactive input device using said second set of interactive interrogations;

sending said second set of interactive interrogations including for use by said first interactive output device; and using said third input information to change said output of said first interactive output device, while not providing input information to said second interactive output device using said second set of interactive interrogations.

9. A method, as claimed in claim 8, wherein:

said first subslot is defined to be part of a second slot and in which said second slot is defined to be comprised of more than one subslot.

10. A method, as claimed in claim 8, wherein:

said first slot is associated with a first transmission rate of about 1/60th of a second and said first subslot is associated with a second transmission rate, which is a multiple of said first transmission rate.

11. A method, as claimed in claim 8, wherein:

said first interactive output device includes a video game engine and said second interactive output device includes a web browser.

12. A method, as claimed in claim 8, further including:

a second subslot that receives input information during at least one set of interactive interrogations that is different from said first set of interactive interrogations.

13. A method for communicating that involves a plurality of interactive input devices including first and second interactive input devices and a plurality of interactive output devices including first and second interactive output devices and that uses a plurality of emulation assemblies including first and second emulation assemblies, comprising:

providing said first emulation assembly with a first configuration associated with a first data transmission type wherein said first interactive input device properly communicates with said first interactive output device;

providing said second emulation assembly with a second configuration associated with a second data transmission type wherein said second interactive input device properly communicates with said second interactive output device using said second emulation assembly;

receiving first input information properly by said first interactive output device using said first emulation assembly related to an output from said first interactive input device wherein said first input information is unable to be properly received by said second interactive output device using said second emulation assembly; and reconfiguring said second emulation assembly to said first configuration wherein said second emulation assembly is associated with said first data transmission type and, after said step of reconfiguring is completed, said second emulation assembly can properly communicate said first input information to an interactive output device that is equivalent to said first interactive output device and said second emulation assembly is unable to properly communicate with said second interactive output device and said second interactive input device.

14. A method, as claimed in claim 13, wherein:

said reconfiguring step includes using a host of a head end system that includes said plurality of interactive output devices.

15. A method, as claimed in claim 13, further including:

receiving second input information properly by said second interactive output device using said second emulation assembly related to an output from said second interactive input device and before said reconfiguring step.

16. A method, as claimed in claim 13, further including:

providing memory that has address information stored therein and sending said address information to said first emulation assembly so that said first input information is properly received by said first emulation assembly.

17. A system for communicating information involving interactive devices, comprising:

a plurality of guest terminal subsystems including at least a first guest terminal subsystem with a first interactive input device and a second guest terminal subsystem with a second interactive input device;

a head end system that provides a first set of interactive interrogations and a second set of interactive interrogations to a plurality of interactive input devices including at least said first interactive input device and said second interactive input device that are different from each other, at least said first set of interactive interrogations including at least a first slot and a first subslot and at least said second set of interactive interrogations includes said first slot, said first and second sets of interactive interrogations being provided to said plurality of interactive input devices at different times and with said second set of interactive interrogations being provided to said plurality of interactive input devices next after said first set of interactive interrogations, said head end system including a plurality of interactive output devices including at least a first interactive output device and a second interactive output device that are different from each other; and a distribution system electrically connected to said plurality of guest terminals and said head end system;

wherein said first slot of said first set of interactive interrogations receives first input information from said first interactive input device, said first subslot of said first set of interactive interrogations receives second input information from said second interactive input device, said first slot of said second set of interactive interrogations receives third input information from said first interactive input device and in which said second set of interactive interrogations lacks input information from said second interactive input device.

18. A system, as claimed in claim 17, wherein:

said plurality of interactive input devices includes a third interactive input device and in which said first subslot is defined to be part of a second slot and said second slot is defined to also have a second subslot, said second subslot of said second set of interactive interrogations receives fourth input information from said third interactive input device.

19. A system, as claimed in claim 17, wherein:

said plurality of interactive input devices includes a third interactive input device and a second subslot is used by said third interactive input device at a time different from said first subslot being used by said second interactive input device, with said first and second subslots being part of a second slot.

20. A system, as claimed in claim 17, wherein:

said head end system includes a plurality of emulation assemblies including a first emulation assembly and a second emulation assembly, said first emulation assembly being associated with a first data transmission type and said second emulation assembly being associated with a second data transmission type that is different from said first data transmission type, said first emulation assembly enabling said first and third input information to be received by said first interactive output device and said second emulation assembly enabling said second input information to be received by said second interactive output device.

21. A system, as claimed in claim 20, wherein:

said first input information is unable to be properly received by said second interactive output device using said second emulation assembly and said second input information is unable to be properly received by said first interactive output device using said first emulation assembly.

* * * * *